Sept. 25, 1962     J. SCHILLING     3,055,499
WILD OAT SEPARATOR
Filed Aug. 26, 1960     3 Sheets-Sheet 1
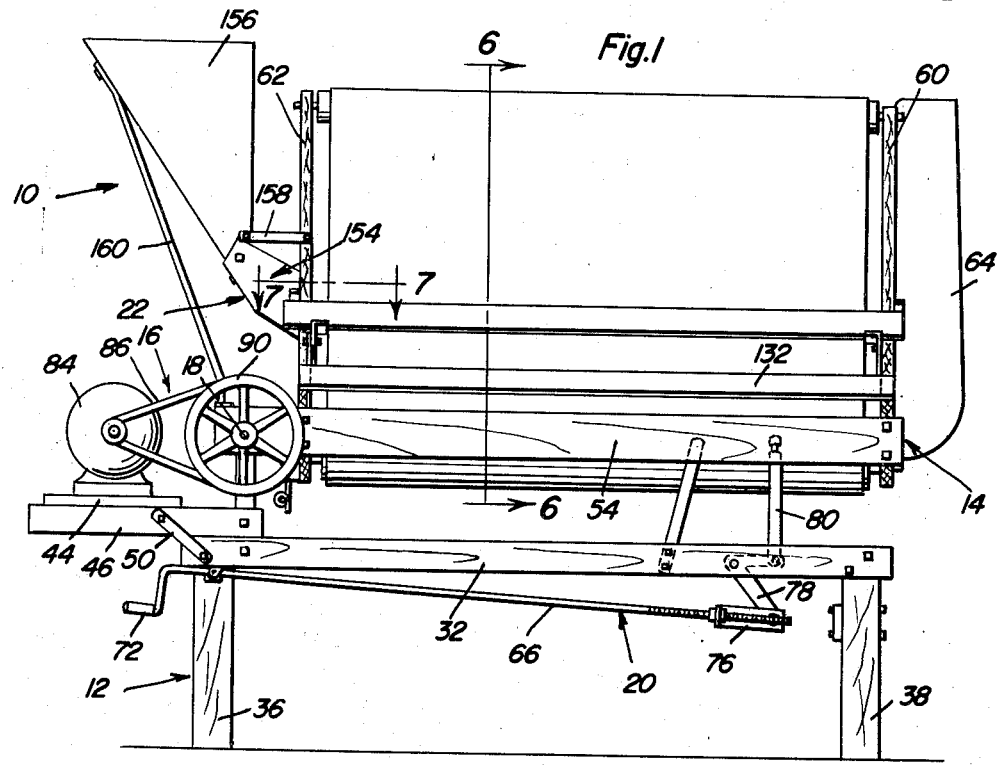
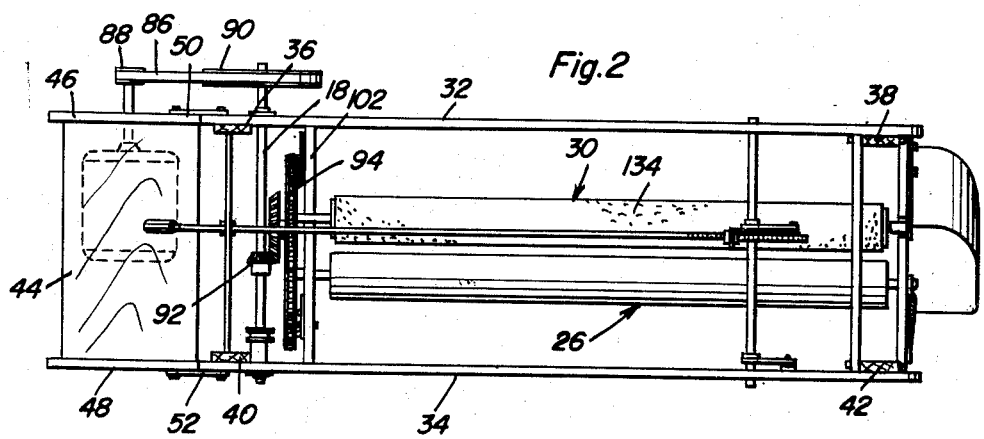
Jacob Schilling
INVENTOR.

Sept. 25, 1962 J. SCHILLING 3,055,499
WILD OAT SEPARATOR
Filed Aug. 26, 1960 3 Sheets-Sheet 2

Jacob Schilling INVENTOR.

BY *[signatures]*
Attorneys

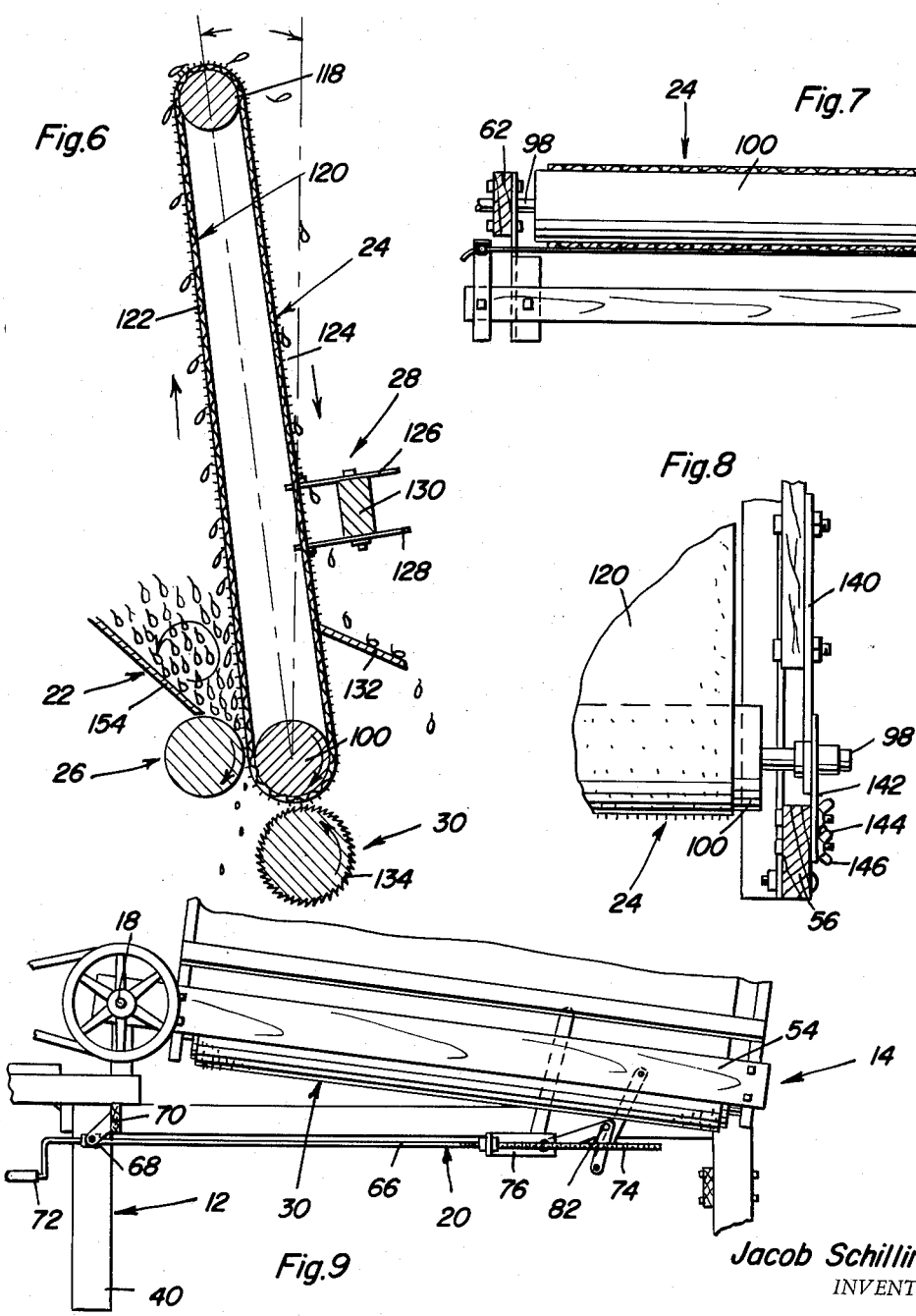

United States Patent Office 3,055,499
Patented Sept. 25, 1962

3,055,499
WILD OAT SEPARATOR
Jacob Schilling, Box 119, Bowdle, S. Dak.
Filed Aug. 26, 1960, Ser. No. 52,244
15 Claims. (Cl. 209—45)

This invention relates to a machine for separating wild oats from a grain mixture composed of predominantly cultivated oats.

A problem which is of particular concern to grain farmers is the intermixing of wild oats with the oats of a harvested crop. Separation of the wild oats from the cultivated oats is therefore a very difficult task. The machine made in accordance with this invention therefore takes advantage of the difference between wild and cultivated oats in that wild oats are characterized by a hook-like tail on one end of the kernel thereof whereas the cultivated kernel of oats are smooth, in order to separate the wild oats from the cultivated oats. The separation process accomplished by the machine accordingly relies on the above noted difference between the kernels of oats to remove the wild oats from the cultivated oats with greater reliability, completeness and efficiency than heretofore possible.

It is therefore a primary object of this invention to provide a wild oat separating machine into which a grain mixture may be supplied and the oat mixture being directed against and conditioned by prolonged contact with a moving belt of flannel-like material to which only the wild oats will adhere by virtue of their hook tail ends, said wild oats being carried out of said mixture and scraped off from the moving belt. It is a further object of this invention to provide a wild oat separating machine whereby the oat mixture is tumbled when fed against a continuously moving adhesion belt insuring that all of the wild oats of the oat mixture come into contact with the belt for more complete removal of the wild oats from the mixture by the adhesion belt despite its otherwise advantageous vertical disposition.

An additional object of this invention is to provide a wild oat separating machine embodying an endless moving adhesion belt to which the wild oats adhere and which also features a belt reconditioning mechanism for restoring the nap on the outer surface of the belt material to thereby restore the adhesive properties of the belt material for continuous efficient collection and removal of the wild oats by the belt material.

A still further object of this invention is to provide a wild oat separating machine employing a moving adhesion belt to which the wild oats adhere which belt moves in a direction upwardly from the hopper device containing the oat mixture so as to collect wild oats through adhesion without reliance on the force of gravity which would otherwise tend to effect removal of desirable oats by the adhesion belt that is horizontally movable even if disposed on an incline as was the case in machines heretofore used for similar purposes.

A still further object of this invention is to provide a wild oat separating machine in which the adhesion belt moves in a substantially vertical direction so as to loosen the wild oats therefrom by centrifugal force as the belt moves about an upper idler wheel enabling a subsequently more complete removal of the wild oats from the belt prior to the return of the cleaned belt surface into the hopper portion of the machine within which the oat mixture is disposed. The belt is accordingly cleaned of the wild oats by means of a scraper element in contact with the belt nap which scraper elements also is effective to reduce the adhesive properties of the belt material. Accordingly, a nap restoring roller is provided for contact with the belt material which restoring roller is rotated in the same direction as the belt but at a slightly increased speed relative thereto so as to gently restore the position of the belt material hairs constituting the nap thereof.

Another object of this invention is to provide a wild oat separating machine which is tiltably mounted on a subframe assembly so that the oat mixture confined between the feeding roller and the adhesion belt will be moved between the sides of the feeding roller and adhesion belt toward a delivery end by the force of gravity, the speed with which the oat mixture moves toward the delivery being governed by the angle of tilt which may accordingly be adjusted so as to vary the length of the interval during which the oats are subjected to the removal action by the continuously moving adhesion belt. The speed with which a grain mixture may be separated from the wild oats will therefore increase with an increase in the tilt of the subframe whereas the completeness with which the grain mixture is separated from the wild oats will decrease with an increase in the tilt of the subframe. Accordingly, the tilt of the subframe may be adjusted for any particular requirements desired with respect to speed and completeness of the separating action. Also, the adhesion belt may be adjusted at some angle to the vertical so as to vary the area of the belt to which the grain in the feed hopper is exposed for contact.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the machine made in accordance with this invention.

FIGURE 2 is a bottom view of the machine illustrated in FIGURE 1.

FIGURE 6 is a partial sectional view taken substantially through a plane indicated by section line 6—6 in FIGURE 1.

FIGURE 7 is a sectional view taken through a plane indicated by section line 7—7 in FIGURE 1.

FIGURE 8 is a sectional view taken substantially through a plane indicated by section line 8—8 in FIGURE 4.

FIGURE 9 is a partial side elevational view showing the machine in an extreme tilt postion.

Figure 3:
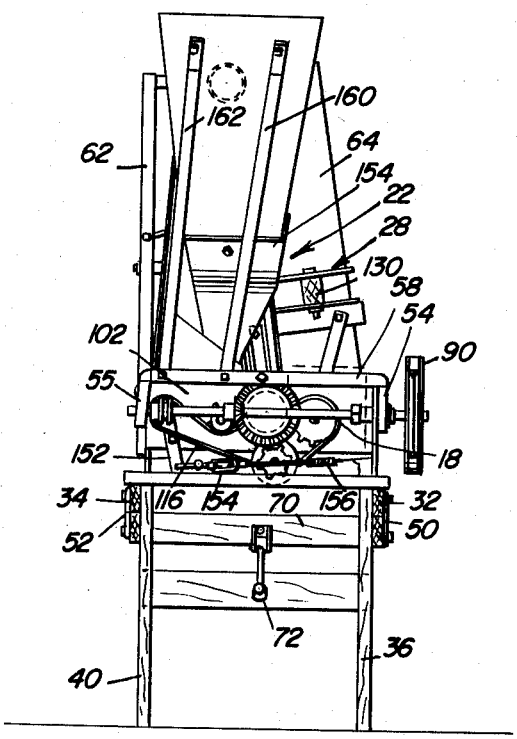
FIGURE 3 is a left side elevational view of the machine illustrated in FIGURE 1.

Referring now to the drawings in detail, the complete machine is illustrated in FIGURES 1, 2, 3 and 4 and is generally designated by reference numeral 10. It will therefore be observed in FIGURE 1, that the machine 10 includes a stationary frame assembly generally indicated by reference numeral 12 and a tiltably adjustable subframe assembly 14. The wild oat separating mechanism of the machine is accordingly mounted on the subframe assembly 14, the subframe assembly 14 being tiltable in order to vary the separating action as hereinbefore indicated.

Figure 5:
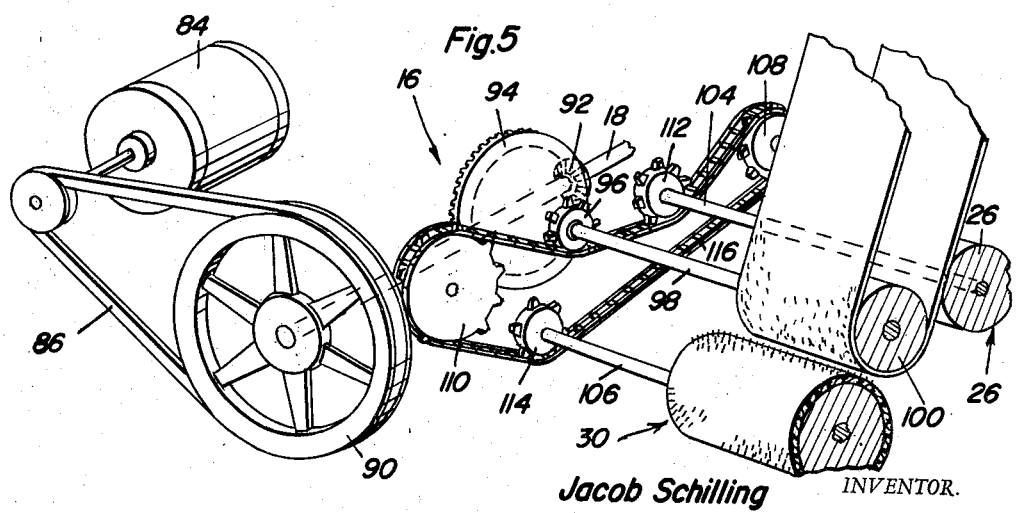
FIGURE 5 is a disassembled perspective view of the drive mechanism for the machine.

It will therefore be observed that a drive mechanism generally indicated by reference numeral 16 which is more clearly illustrated in FIGURE 5 is mounted on the stationary frame assembly 12 and overhangs at one side thereof as seen in FIGURES 1 and 9, said drive mechanism 16 including a drive shaft 18 containing an axis about which the subframe assembly 14 is pivotally adjusted as more clearly seen by comparing FIGURES 1 and 9. An adjusting mechanism generally indicated by reference numeral 20 is accordingly provided for effecting the pivotal adjustment of the subframe assembly 14.

The subframe 14 on the other hand, mounts the moving mechanism of the machine whereby the wild oat separating action is realized. Accordingly, a loading hopper device generally indicated by reference numeral 22 is mounted on the subframe assembly 14 at the driving end thereof. The subframe assembly 14 also movingly mounts dry adhesion belt mechanism generally indicated by reference numeral 24 as more clearly seen in FIGURES 4 and 6. The adhesion belt mechanism 24 therefore cooperates with a feed roller mechanism 26 to receive a mixture of grain from the hopper device 22 including both cultivated and wild oats an inlet end or left end of the feed mechanism as viewed in FIGURES 1, 2 and 9. The wild oats are accordingly carried upwardly on one side of the belt mechanism 24 and removed therefrom by a scraper mechanism generally indicated by reference numeral 28 as more clearly seen in FIGURES 6 and 3, which scraper mechanism is also mounted on the subframe assembly 14. The belt mechanism material is then subsequently reconditioned by restoring the nap thereof by means of a nap restoring roller mechanism generally indicated by reference numeral 30 as more clearly seen in FIGURES 5 and 6. The restoring roller mechanism 30, feed roller mechanism 26 and the adhesion belt mechanism 24 are accordingly drivingly interconnected by and driven by the drive mechanism 16.

Referring once again to FIGURES 1, 2, 3 and 4, it will be observed that the stationary frame assembly 12 includes a pair of parallel horizontal frame members 32 and 34 which are supported by corner post legs 36, 38, 40 and 42. A motor support platform 44 as more clearly seen in FIGURES 1 and 2 is, accordingly, mounted on top of the parallel horizontal frame members 32 and 34 by means of members 46 and 48 connected thereto and extending therefrom in cantilever fashion or to one side of the frame assembly 12. Connecting links 50 and 52 are therefore provided for further bracing connection between the members 46 and 48 with the frame members 32 and 34, respectively. It will also be appreciated that other bracing members for the frame assembly 12 may be provided as needed.

Figure 4:
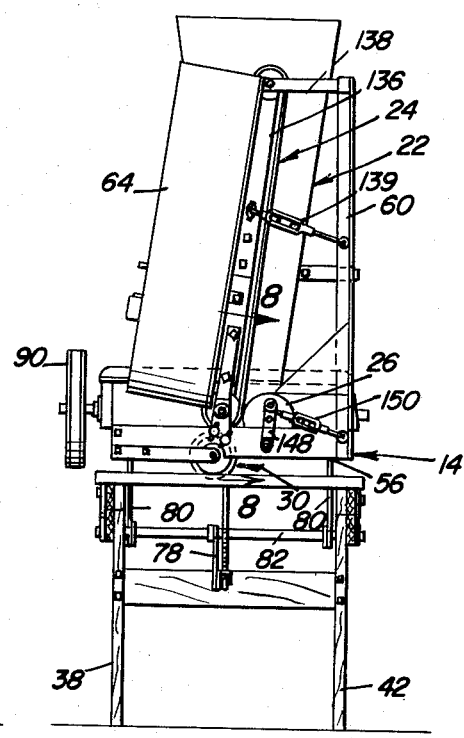
FIGURE 4 is a right side elevational view of the machine illustrated in FIGURE 1.

The subframe assembly 14 includes a pair of parallel frame members 54 and 55 interconnected at the delivery end by a member 56 as seen in FIGURE 4, while at the driving end the parallel frame members 54 and 55 are connected by a top connecting member 58 as seen in FIGURE 3. Also, a pair of upright frame members 60 and 62 are connected to the parallel frame members 54 and 55 adjacent the delivery end portion of the frame assembly 14 and the driving inlet end portion thereof respectively, as more clearly seen in FIGURE 1. Accordingly, the delivery ends and inlet ends of the feed roller 26, the nap restoring roller 30 and the adhesion belt mechanism 24 respectively are mounted between the vertical frame members 60 and 62 adjacent the delivery end portion 64 and driving inlet end portion respectively of the frame assembly.

The adjustable tilt mechanism 20 is therefore mounted on the stationary frame assembly 12 and operatively connected to the pivoted subframe 14 for pivotal adjustment thereof. The adjustment mechanism 20 therefore includes a control screw member 66 as seen in FIGURES 1 and 9 which is rotatably mounted by a pivoted bracket member 68 by a cross member 70 connected between the legs 36 and 40 of the stationary frame assembly 12. A crank handle 72 is connected to one end of the control rod 66 while the opposite end has a threaded portion 74 which threadedly engages with the control element 76 for axial movement thereof along the control shaft 66 when it is rotated. Axial movement of the element 76 accordingly lowers or raises the delivery end of the subframe 14 by means of a linkage connection including a lever element 78 pivotally connected at one end to the element 76 and having another arm link connected to a pair of link members 80 which are connected to the side frame members 54 and 55 of the subframe 14, said link members 80 being pivotally connected to lever arms which are fixed to the pivot shaft 82 to which the lever member 78 is connected. Attention is accordingly invited toward FIGURES 1, 9 and 4. It will therefore be apparent, that upon rotation of the crank handle 72 in one or the other direction the subframe 14 will be raised or lowered at its delivery end about the axis extending through the drive shaft 18 of the drive mechanism 16, the side frame members 54 and 55 of the subframe 14 being pivotally mounted on said drive shaft 18.

Referring to FIGURES 1, 3 and 5 it will be observed that the drive mechanism 16 includes an electric motor 84 which is mounted on the platform 44 overhanging one end of the stationary frame assembly 12. The motor is drivingly connected to the drive shaft 18 by means of a belt 86 which is trained about a motor pulley 88 and a drive pulley 90 connected to the drive shaft 18. A bevel gear 92 is fixed to the drive shaft intermediate the ends thereof which bevel gear 92 meshes with a larger bevel gear 94 which, in turn, is connected to the sprocket wheel 96. The sprocket wheel 96 is mounted on a shaft 98 to which a lower elongated belt roller wheel 100 is connected as more clearly seen in FIGURE 5. It will therefore be observed that a cross mounting member 102 is connected between the side frame members 54 and 55 of the subframe 14 for the purpose of rotatably mounting the shaft member 98 in spaced relation to shaft members 104 and 106 to which the elongated feed roller 26 and canvas covered nap restoring roller 30 are connected respectively. The mounting member 102 also rotatably mounts adjacent its outer end a pair of idler sprocket wheels 108 and 110. All of the sprocket wheels 96, 108 and 110 as well as sprocket wheels 112 and 114 connected to the feed roller shaft 104 and nap restoring roller shaft 106 respectively, are drivingly interconnected by means of the endless chain belt 116 to thereby drive from the motor 84 the feed roller, driving belt roller 100 and nap restoring roller 30 in the proper directions and speeds relative to each as will hereafter be explained.

Referring therefore to FIGURE 6 in particular, it will be observed that the inlet hopper device 22 directs the mixture of oats from the driving end toward the adhesion belt mechanism. The belt mechanism 24 therefore includes the lower belt driving roller 100 hereinbefore referred to and an upper idler roller 118. The belt 120 is therefore trained about the rollers 100 and 118 which thereby cause the belt on side 122 thereof to move upwardly while the side 124 moves downwardly inasmuch as the driving roller 100 is rotated by the drive mechanism 16 in a clockwise direction as viewed in FIGURE 6. The belt 120 is made of a felt-like or flannel-like blanket material that has a nap thereon which has the properties of causing the wild oats with their hook tail to adhere to the surface of the belt material. The cultivated oats on the other hand being characterized by smooth shaped kernels will not adhere to the belt material. Accordingly, the belt moving against the oat mixture confined within the hopper device 22 will carry the wild oats upwardly out of the hopper. The feed roller 26 is accordingly rotated in a clockwise direction as viewed in FIGURE 6 so as to direct or feed the oat mixture against the upwardly moving side 122 of the belt 120. Accordingly, the oat mixture being admitted at the driving end of the machine will move downwardly toward the delivery end of the subframe 14 at a rate depending on the tilt of the subframe as controlled by the adjusting mechanism 20. As the grain mixture moves down the incline the belt side 122 continuously moving upwardly against the oat mixture causes the oat kernels to be tumbled in a counterclockwise direction as indicated by the arrow in FIGURE 6 so that the kernels may be directed into contact with the belt material repeatedly as the mixture moves down the incline. Accordingly, a more complete removal of the wild oats from the mixture is made possible. It will also be observed in FIGURE 6 that the feed roller 26 is spaced from the outer surface of the belt 120 a sufficient distance so that the oat kernels will not fall therebetween whereas other refuse particles of smaller size will drop therebetween.

It will be observed also in FIGURE 6, that the wild oats when carried over the idler roller wheel 118 about which the belt 120 is trained, the action of centrifugal force will loosen the wild oats from the belt material so that some of the wild oats will fall off therefrom. However, in order to assure complete cleaning of the wild oats from the belt material on the side 124 thereof which moves downwardly toward the driving roller wheel 100 for return movement through the hopper device 22, the scraper device 28 is provided which contacts the belt material to positively scrape and clean the wild oat kernels therefrom. The scraper device 28 accordingly includes a pair of spaced scraper elements 126 and 128 which contact the material of the belt 120 and positively clean the wild oats therefrom. As seen in FIGURE 3, the scraper elements are mounted on a mounting member 130 which is connected to the subframe. Also, a deflecting member 132 is disposed longitudinally along the downward side 124 of the belt 120 in order to deflect the wild oats removed by the scraper device away from the belt. The deflecting member 132 is accordingly connected between the end frame members 60 and 62 as seen in FIGURE 1.

It will be apparent that the nap of the belt material will be pressed down as the belt passes by the scraper device elements. Accordingly, the adhesive properties of the belt material will be significantly reduced as a result thereof. Therefore, the nap restoring roller device 30 is provided for the purpose of restoring the nap and adhesive properties of the belt material prior to movement of the belt through the hopper device 22. The nap restoring roller 30 is therefore disposed below the driving roller 100 and has a canvas material 134 mounted thereon for light contact with the belt material and is thereby effective to restore the nap on the belt material. The nap restoring roller device 30 is so effective by virtue of the fact that it is rotated in an opposite direction to the rotation of the driving roller 100 so that the contacting portions of the canvas material 134 and the belt material will move in the same direction. Also, the speed of the canvas material 134 is arranged to be slightly greater than that of the belt material in order to accomplish its purpose. Accordingly, the sprocket gears of the drive mechanism 16 are selected with the appropriate number of teeth in order to rotate the driving roller 100 and feed roller 26 in the same direction of rotation while the nap restoring roller 30 is driven in an opposite direction of rotation at a slightly greater speed than that of the driving roller 100.

It will be observed that the inclination of the belt mechanism 24 and the tension of the belt itself may be varied for the purpose of obtaining the most efficient wild oat removal action by changing the contact area of the belt 24 within the hopper device 22 and also to loosen the belt tension and enable easy disassembly and replacement of the belt material 120. Referring therefore to FIGURES 4 and 8 in particular, it will be observed that a belt mounting frame member 136 is provided for rotatably mounting at its upper end the idler roller 118 while at the lower end the driving roller 100 is adjustably and rotatably mounted. Accordingly, the upper end of the belt mounting member 136 is pivotally connected to the member 138 projecting from the frame member 60. The lower end of the belt mounting member 136 has connected thereto a projecting iron member 140 which is pivotally connected to a member 142 which, in turn, is adjustably mounted on the frame member 56 of the subframe 14 by means of a pair of wing nuts 144 and 146. Accordingly, the mounting plate elements 140 and 142 may be adjustably connected to the subframe 14 and to the belt mechanism mounting frame member 136 for pivotally adjusting the position thereof and loosening or tightening the belt by varying the distance between the upper and lower axes. The turnbuckle connection 139 also provides for additional positional adjustment of the belt mechanism frame 136.

It will also be observed in FIGURE 4, that the feeding roller is rotatably mounted by a lever mounting member 148 which is pivotally connected to the end frame member 56 of the subframe 14. Accordingly, the position of the lever mounting member 148 may be adjusted by the turnbuckle mechanism 150 so that the spacing between the feeding roller 26 and the lower driving roller 100 of the belt mechanism 24 may be accurately adjusted.

It will also be observed in FIGURE 3, that the tension of the driving chain belt 116 of the drive mechanism 16 is maintained at proper tension by means of a belt tightener mechanism which includes a lever mounting member 152 for the idler sprocket wheel 108, said lever mounting member 152 being pivotally mounted on the mounting member 102 for the drive mechanism 16 while the lower end of the lever mounting member 152 is connected by a turnbuckle connection 154 and a spring element 156 to the subframe 14 for imposing the springbias on the lever mounting member in a counterclockwise direction as viewed in FIGURE 3 to thereby tension the driving chain belt 116 engaged with the idler roller 108.

Referring now to FIGURES 1 and 3, it will be observed that the hopper device 22 includes the lower hopper portion 154 which is disposed above the feeding roller 26 at one end thereof and rigidly connected to the frame member 62 of the subframe 14. Also, the upper hopper portion 156 is connected to the lower portion 154 and supported by connecting links 158 and a pair of iron strap members 160 and 162.

From the foregoing description, operation and use of the wild oat separating machine will be apparent. Reviewing however its operations, it will be recalled that the subframe 14 is adjusted by adjusting mechanism 20 to a predetermined tilt position relative to the stationary frame assembly 12 so that the oat mixture delivered by the hopper device 22 at the upper end of the subframe 14 may move downwardly along the inclined subframe 14 between the longitudinally extending portion of the lower hopper portion 154 and the elongated feed roller 26 and the lower but upwardly moving side 122 of the belt 120 of the belt mechanism 24.

The oat kernels will be tumbled by the upwardly moving belt material and the downwardly moving portion of the feed roller 26 which is spaced from the belt a sufficient distance to allow refuse to pass therebetween and yet retain the oat kernels. The wild oat kernels being characterized by hook tails will adhere to the belt material and be carried upwardly over the top of the idler roller 118. The wild oats remaining on the belt material will be scraped therefrom by the scraper device 28 and deflected away from the belt by the deflector member 132. The belt will subsequently pass in contact with the moving nap restoring roller 30 to restore the adhesive properties of the belt material prior to contact with the oat mixture once again. The drive mechanism 16 accordingly interconnects the rollers for rotation thereof in the proper direction and speed relative to each other. It will therefore be appreciated that as a result of the continuously upwardly moving belt material which is continuously being reconditioned prior to contact with the oat mixture enables a more complete removal of the wild oats from the oat mixture. Also, the tumbling action of the oat kernels by virtue of the cooperation between the feeding roller 26 and upwardly moving belt side 120 enables the oat kernels to come into repeated contact with the belt as the kernels move downwardly along the inclined subframe 14. Accordingly, by adjusting the incline of the subframe 14 the wild oat separation speed and degree of separation may be varied inversely with respect to each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for separating wild oats from cultivated oats in a grain mixture comprising, frame means, continuously moving wild oat adhesion mounted on said frame means for movement upwardly on that side thereof in contact with the grain mixture for collecting only wild oats, feed means mounted on said frame means in spaced relation to the adhesion means operative to continuously direct said grain mixture toward said adhesion means between an inlet end and a delivery end of the feed means for prolonged tumbling and contact with said adhesion means thereby removing wild oats from the mixture before arrival at the delivery end, and adjustable means operatively connected to said feed means for variably tilting the feed means between inlet and delivery ends thereof to and thereby vary the interval of contact between the grain mixture and the adhesion means.

2. A machine for separating wild oats from cultivated oats in a grain mixture comprising, frame means, continuously moving wild oat adhesion means mounted on said frame means for movement upwardly on that side thereof in contact with the grain mixture for collecting only wild oats, and feed means mounted on said frame means in spaced relation to the adhesion means operative to continuously direct said grain mixture towards said adhesion means between an inlet end and a delivery end of the feed means for prolonged tumbling and contact with said adhesion means thereby removing wild oats from the mixture before arrival at the delivery end, adjustable means operatively connected to said feed means for variably tilting the feed means between inlet and delivery ends thereof to thereby vary the interval of contact between the grain mixture and the adhesion means, said feed means including a moving portion adjacent to said adhesion means moving in a direction opposite to movement of the adhesion means to continuously tumble and direct the grain mixture into contact with said adhesion means throughout movement thereof between inlet and outlet ends.

3. The combination of claim 2, wherein the moving portion of said feed means includes a feed roller means rotatably mounted by said frame means in close spaced relation to the belt means to confine only particles of oat size therebetween, said feed roller means being mounted on the upwardly moving side of the belt means and rotating in the same direction as said vertically spaced belt roller means and hopper means mounted on said frame means and disposed above said feed roller means for receiving and retaining a grain mixture between the feed roller means and the belt means.

4. The combination of claim 2, including nap restoring roller means in contact with said belt means adjacent the lower belt roller means in said vertically spaced roller means, said restoring roller means being rotatably mounted by the frame means for rotation in a direction opposite to said vertically spaced roller means.

5. The machine as defined in claim 2, wherein said adhesion means comprises an endless belt means having a nap to which wild oats will adhere, and vertically spaced roller means rotatably mounted by said frame means about which said belt means is entrained for continuous movement of said belt means in one direction.

6. The machine as defined in claim 5, wherein one of said vertically spaced roller means is adjustably mounted for slidable adjustment toward or away from the other roller means enabling easy removal and replacement of the belt means.

7. The machine as defined in claim 6, wherein the moving portion of said feed means includes a feed roller means rotatably mounted by said frame means in close spaced relation to the belt means to confine only particles of oat size therebetween, said feed roller means being mounted on the upwardly moving side of the belt means and rotating in the same direction as said vertically spaced belt roller means and hopper means mounted on said frame means and disposed above said feed roller means for receiving and retaining a grain mixture between the feed roller means and the belt means.

8. The machine as defined in claim 7, including nap restoring roller means in contact with said belt means adjacent the lower belt roller means in said vertically spaced roller means, said restoring roller means being rotatably mounted by the frame means for rotation in a direction opposite to said vertically spaced roller means.

9. The machine as defined in claim 8, including belt drive means drivingly connected to said lower belt roller means, feed roller means and nap restoring roller means for drive thereof in their respective directions of rotation.

10. The machine as defined in claim 9, wherein said drive means includes an input shaft about which the frame means is adjustably pivotally mounted by the adjustable mounting means.

11. A machine for separating wild oats from cultivated oats in a grain mixture comprising, frame means, continuously moving wild oat adhesion means mounted on said frame means for upward movement on that side thereof which is in contact with said grain mixture for collecting only wild oats, feed means mounted on said frame means in spaced relation to the adhesion means operative to continuously direct wild and cultivated oats only from a grain mixture into contact with said adhesion means for a prolonged interval of tumbling and contact by said adhesion means to thereby collect and remove wild oats from the cultivated oats, said adhesion means comprising an endless belt means having a nap to which wild oats will adhere, and vertically spaced roller means rotatably mounted by said frame means about which said belt means is entrained for continuous movement of said belt means in one direction, said feed means including a feed roller means rotatably mounted by said frame means in close spaced relation to the belt means to confine only particles of oat size therebetween, said feed roller means being mounted on the upwardly moving side of the belt means and rotating in the same direction as said vertically spaced belt roller means and hopper means mounted on said frame means and disposed above said feed roller means for receiving and retaining a grain mixture between the feed roller means and the belt means.

12. A machine for separating cultivated oats from a grain mixture containing also wild oats, comprising, feed means having an inlet end and a delivery end and continuously propelling only wild and cultivated oats from a grain mixture supplied thereto while conducting gravity induced movement of the mixture between said inlet end and said delivery end, and dry adhesion means mounted for movement upwardly on one side thereof in prolonged contact with said grain mixture presented thereto by the feed means for adhesion of said wild oats to said one side against the force of gravity, said feed means including tumbling roller means extending between said inlet and delivery ends in close spaced relation to the wild oat adhesion means for retaining only wild and cultivated oats thereabove in tumbling movement against the adhesion means.

13. The combination of claim 12, wherein said adhesion means comprises belt means vertically movable in an upward direction in contact with the grain mixture in the feed means for collecting wild oats.

14. The combination of claim 13, wherein said belt means includes adhesion material entrained about a lower roller and an upper roller vertically spaced above the feed means for upward movement of the adhesion material a substantial distance out of contact with the grain mixture to prevent withdrawal of cultivated oats, and means for angularly adjusting the upper roller with respect to the lower roller to vary the contact area on the adhesion material to which the grain mixture is exposed.

15. A machine for separating cultivated oats from a grain mixture containing also wild oats, comprising, feed means having an inlet end and a delivery end and continuously propelling only wild and cultivated oats from a grain mixture supplied thereto while conducting gravity induced movement of the mixture between said inlet end and said delivery end, and dry adhesion means mounted for movement upwardly on one side thereof in prolonged contact with said grain mixture presented thereto by the feed means for adhesion of said wild oats to said one side against the force of gravity, said adhesion means comprising belt means vertically movable in an upward direction in contact with the grain mixture in the feed means for collecting wild oats, said belt means including adhesion material entrained about a lower roller and an upper roller vertically spaced above the feed means for upward movement of the adhesion material a substantial distance out of contact with the grain mixture to prevent withdrawal of cultivated oats, and means for angularly adjusting the upper roller with respect to the lower roller to vary the contact area on the adhesion material to which the grain mixture is exposed.

References Cited in the file of this patent

FOREIGN PATENTS

| | | |
|---|---|---|
| 352,263 | Canada | Aug. 13, 1935 |
| 612,358 | Great Britain | Nov. 11, 1948 |